United States Patent [19]
Walker et al.

[11] Patent Number: 6,052,667
[45] Date of Patent: Apr. 18, 2000

[54] METHOD AND APPARATUS FOR SELLING AN AGING FOOD PRODUCT AS A SUBSTITUTE FOR AN ORDERED PRODUCT

[75] Inventors: Jay S. Walker, Ridgefield; Andrew S. Van Luchene, Norwalk, both of Conn.; Joshua D. Rogers, New York, N.Y.

[73] Assignee: Walker Digital, LLC, Stamford, Conn.

[21] Appl. No.: 09/157,837

[22] Filed: Sep. 21, 1998

Related U.S. Application Data

[63] Continuation-in-part of application No. 09/083,483, May 22, 1998, which is a continuation-in-part of application No. 08/920,116, Aug. 26, 1997, which is a continuation-in-part of application No. 08/822,709, Mar. 21, 1997.

[51] Int. Cl.[7] .................................................. G06F 17/60
[52] U.S. Cl. .............................. 705/15; 705/20; 705/22
[58] Field of Search ............................. 705/1, 7, 14, 15, 705/16, 20, 21, 22, 24

[56] References Cited

U.S. PATENT DOCUMENTS

| | | | |
|---|---|---|---|
| 5,128,862 | 7/1992 | Mueller | 705/15 |
| 5,172,328 | 12/1992 | Cahlander et al. | 364/477.05 |
| 5,353,219 | 10/1994 | Mueller et al. | 705/16 |
| 5,510,979 | 4/1996 | Moderi et al. | 705/18 |

OTHER PUBLICATIONS

Mark Hamstra, "'Made for You' Maneuvers Signal Competitive Shift in QSR Category", Nations Restaurant News (http://www.nrn.com), Apr. 13, 1998.

Jim Kirk, "Digital Promotions Make Quick point", Chicago Tribunem, Dec. 26, 1997 at p. 1.

Progressive Introduces Kitchen Display System (KDS) for Restaurants, PR Newswire, Jan. 23, 1998.

"Brochure: Positive Input, The McDonald's POS–3 System Newsletter from Olivetti Solutions/OLSY", Spring/Summer Edition 1998.

Brochure: "NCR 7453 PC–Based Point–of–Sale Solution", NCR Corp, 1998.

Brochure: "Universal Holding Cabinet Rollout Program", H&K Dallas, Inc., 1998.

Brochure: "For the Crew & the Customer, The Best Drive–Thru & Grill Service", Olivetti North America, 1998.

Brochure: "Satisfaction?", Frymaster Corporation, 1998.

*Primary Examiner*—Stephen R. Tkacs
*Attorney, Agent, or Firm*—Dean Alderucci

[57] ABSTRACT

A POS terminal receives an order for a food product. The POS terminal in turn selects a complementary product based on the food product. The selected complementary product has an age within a predetermined age range, such as between seven and ten minutes since the product was assembled. The POS terminal outputs an offer to substitute the complementary product for the food product. In one embodiment, the substitution is performed with no additional charge, so the customer will pay the price of the food product for the complementary product if he accepts the offer. The customer's response to the offer is received. If the response indicates acceptance of the offer, then the complementary product is sold in place of the food product.

48 Claims, 23 Drawing Sheets

| FOOD PRODUCT IDENTIFIER 520 | FOOD PRODUCT DESCRIPTION 522 | RETAIL PRICE 524 | COST 526 |
|---|---|---|---|
| 123 | HAMBURGER | $0.69 | $0.18 |
| 124 | CHEESEBURGER | $0.79 | $0.20 |
| 125 | CHICKEN SANDWICH | $1.59 | $0.59 |
| 126 | APPLE PIE | $0.49 | $0.13 |
| 127 | DOUBLE CHEESEBURGER | $1.50 | $0.48 |
| 128 | BIGG BURGER | $1.10 | $0.39 |
| 129 | BIGG BURGER W/ CHEESE | $1.50 | $0.46 |

FIG. 5

FOOD PRODUCT: 127  DOUBLE CHEESEBURGER

| TIME ASSEMBLED 624 | AGE 625 | TIME SOLD/ DISCARDED 626 | STATUS 628 | PRICE SOLD FOR 630 |
|---|---|---|---|---|
| 2:18 PM | 1:00 MIN. | -- | AVAILABLE | -- |
| 1:08 PM | -- | 1:17 PM | DISCARD | -- |
| 1:25 PM | -- | 1:32 PM | SOLD/ SUBSTITUTION | $0.79 |
| 1:29 PM | -- | 1:37 PM | SOLD/ CHANGE DUE | $0.24 |
| 1:36 PM | -- | 1:41 PM | SOLD/ FULL PRICE | $1.50 |
| 2:14 PM | 5:00 MIN. | -- | AVAILABLE | -- |

FIG. 6

| PRODUCT CATEGORY 920 | PRODUCT IDENTIFIERS 922 |
|---|---|
| A | 100,120,137,141 |
| B | 18,24,37,99 |
| C | 302,307,338 |

FIG. 9

| ORDERED FOOD PRODUCT IDENTIFIER 1020 | ORDERED FOOD PRODUCT DESCRIPTION 1022 | COMPLEMENTARY PRODUCTS 1024 | COMPLEMENTARY PRODUCT DESCRIPTION 1026 |
|---|---|---|---|
| 123 | HAMBURGER | 124, 127, 128 | CHEESEBURGER, DOUBLE CHEESEBURGER, BIGG BURGER |
| 124 | CHEESEBURGER | 127, 129 | DOUBLE CHEESEBURGER, BIGG BURGER W/ CHEESE |
| 128 | BIGG BURGER | 129 | BIGG BURGER W/ CHEESE |

FIG. 10

| COMPLEMENTARY PRODUCT 1120 | COMPLEMENTARY PRODUCT DESCRIPTION 1122 | ORDERED FOOD PRODUCT 1124 | ORDERED FOOD PRODUCT DESCRIPTION 1126 |
|---|---|---|---|
| 124 | CHEESEBURGER | 123 | HAMBURGER |
| 127 | DOUBLE CHEESEBURGER | 123, 124 | HAMBURGER, CHEESEBURGER |
| 128 | BIGG BURGER | 123 | HAMBURGER |
| 129 | BIGG BURGER W/ CHEESE | 124, 128 | CHEESEBURGER, BIGG BURGER |

FIG. 11

| OFFER IDENTIFIER 1320 | TRANSACTION IDENTIFIER 1322 | ORDERED PRODUCT IDENTIFIER 1324 | OFFERED PRODUCT IDENTIFIER 1326 | ACCEPTED? 1328 |
|---|---|---|---|---|
| 123456 | 1234567890 | 123 | 124 | NO |
| 123457 | 1765432109 | 128 | 129 | YES |
| 123458 | 1222333444 | 124 | 127 | YES |
| 123459 | 1333444555 | 123 | 128 | YES |

FIG. 13

| TYPE OF OFFER 1920 | TIME TO MAINTAIN 1922 | ACTION TO TAKE AFTER TIME ELAPSES 1924 |
|---|---|---|
| SUBSTITUTE | 15 SECONDS | AUTOMATICALLY ACCEPT |
| EXCHANGE FOR CHANGE DUE | 25 SECONDS | AUTOMATICALLY REJECT |
| SUGGESTIVE SELL | 20 SECONDS | AUTOMATICALLY REJECT |

METHOD AND APPARATUS FOR SELLING AN AGING FOOD PRODUCT AS A SUBSTITUTE FOR AN ORDERED PRODUCT

The present application is a continuation-in-part application of co-pending patent application Ser. No. 09/083,483, entitled "METHOD AND APPARATUS FOR SELLING AN AGING FOOD PRODUCT", filed on May 22, 1998, which is a a continuation-in-part application of co-pending patent application Ser. No. 08/920,116, entitled METHOD AND SYSTEM FOR PROCESSING SUPPLEMENTARY PRODUCT SALES AT A POINT-OF-SALE TERMINAL, filed on Aug. 26, 1997, which is a continuation-in-part of co-pending patent application Ser. No. 08/822,709, entitled SYSTEM AND METHOD FOR PERFORMING LOTTERY TICKET TRANSACTIONS UTILIZING POINT-OF-SALE TERMINALS, filed on Mar. 21, 1997, each of which are incorporated herein by reference as part of the present disclosure.

FIELD OF THE INVENTION

The present invention relates to methods and apparatus for selling aging food products.

BACKGROUND OF THE INVENTION

Many quick service restaurants will sell food products for some time after those food products have been prepared. For example, hamburgers may be available for sale up to twenty minutes after being cooked. Food products that are excessively aged become "perished" (e.g. stale or soggy). Selling such perished food products would hurt the reputation of the restaurant. Furthermore, aged food products can pose a significant health risk to consumers, which in turn would impose liability on the restaurant. Accordingly, if the food product is not sold within a certain time period after being prepared it is typically thrown away. This waste is considered a cost of doing business.

Once a food product has been assembled from food components, there is a limited time period within which the food product may be sold. For example, an assembled hamburger may be discarded after twenty minutes. Assembled food products are typically maintained in a warming bin or similar warming apparatus while they await sale, as are other food products that are ready to sell yet require no assembly.

Food products and food components are often discarded at considerable cost to the restaurant. It would be advantageous to reduce the costs associated with the inability to sell perished food products.

SUMMARY OF THE INVENTION

It is an object of the present invention to reduce the costs associated with the inability to sell all food products that are prepared in a restaurant.

In accordance with the present invention, a POS terminal receives an order for a food product. The POS terminal in turn selects a complementary product based on the food product. The selected complementary product has an age within a predetermined age range, such as between seven and ten minutes since the product was assembled.

The POS terminal outputs an offer to substitute the complementary product for the food product. In one embodiment, the substitution is performed with no additional charge, the customer will pay the price of the food product for the complementary product if he accepts the offer. The customer's response to the offer is received. If the response indicates acceptance of the offer, then the complementary product is sold in place of the food product.

BRIEF DESCRIPTION OF THE DRAWINGS

FIG. 5 is a schematic illustration of an inventory database of the store server of FIG. 4.

FIG. 6 is a schematic illustration of a record of an aged inventory database of the store server of FIG. 4.

FIG. 9 is a schematic illustration of an embodiment of a possible substitute database of the store server of FIG. 4.

FIG. 10 is a schematic illustration of another embodiment of the possible substitute database of the store server of FIG. 4.

FIG. 11 is a schematic illustration of another embodiment of the possible substitute database of the store server of FIG. 4.

FIG. 13 is a schematic illustration of a substitute offers database of the store server of FIG. 4.

FIG. 19 is a schematic illustration of a database of the store server of FIG. 4.

DETAILED DESCRIPTION OF THE PREFERRED EMBODIMENTS

The present invention allows a restaurant or similar entity to increase profits by identifying and selling aged food products that would otherwise have been discarded. Food products are maintained in warming bins while they await being sold. If an aged food product in a warming bin cannot be used to satisfy an order (whether an actual or anticipated order), then a POS terminal or other device provides an offer to substitute the aged food product for another food product that the customer has ordered.

If the offer is accepted, the aged food product is sold and registered as no longer available for sale. Thus by automatically tracking aged food products, determining appropriate prices for those food products, and dynamically adjusting a database of available food products, a restaurant may further reduce the waste associated with aged food products.

Figure 1:
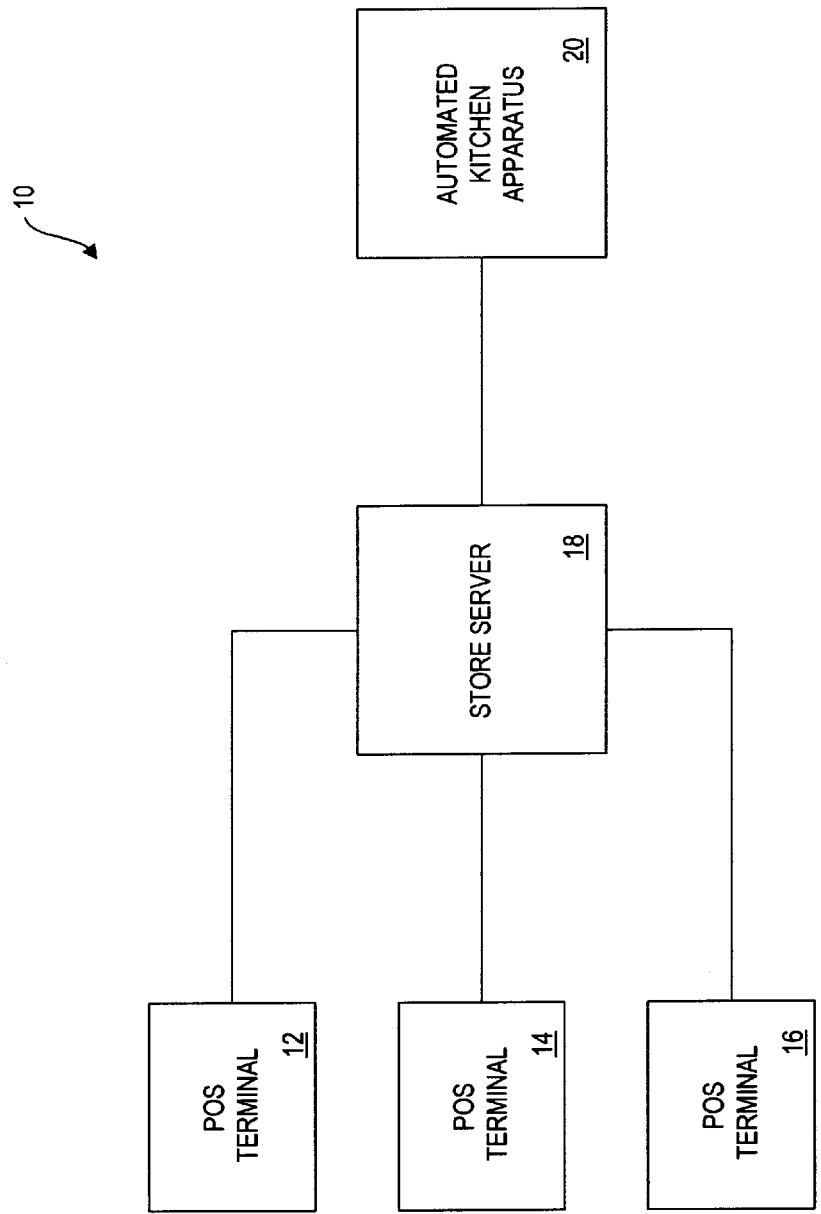
FIG. 1 is a schematic illustration of a restaurant apparatus provided in accordance with the present invention.

Referring to FIG. 1, a restaurant apparatus 10 includes point-of-sale ("POS") terminals 12, 14 and 16, each of which are in communication with a store server 18. The POS terminals 12, 14 and 16 may be, for example, the NCR 7454 manufactured by NCR Corporation the IBM 4683 manufactured by International Business Machines, or the PAR Microsystems POS III or POS IV. The POS terminals 12, 14 and 16 perform such processes as calculating the total price of a purchase (goods or services) and calculating the amount of change due to a customer. The POS terminals 12, 14 and 16 may furthermore track purchases made and adjust databases of inventory accordingly. Any number of POS terminals may be included in the restaurant apparatus 10. Although three POS terminals are shown in FIG. 1, any number of POS terminal, may be in communication with the store server 18 without departing from the spirit and scope of the present invention.

The store server 18 directs the operation of, stores data from and transmits data to the POS terminals 12, 14 and 16. The store server 18 may itself be a POS terminal, as described herein, or may be another computing device that can communicate with one or more POS terminals. Each of the POS terminals 12, 14 and 16 may be located in the same store, in different stores of a chain of stores, or in other locations. The store server 18 may perform many of the processes described below, especially those processes that are performed for more than one POS terminal. The store server 18 may furthermore store data, such as an inventory database, that is to be shared by the POS terminals 12, 14 and 16. Similarly, data described herein as stored on the store server 18 may be stored on the POS terminals 12, 14 and 16, as appropriate.

The store server 18 is also in communication with an automated kitchen apparatus 20. The automated kitchen apparatus 20, described in further detail below, includes components for preparing food products for sale to customers. The store server 18 receives from the automated kitchen apparatus 20 an indication of aged food products that should be sold. The store server 18 in turn communicates with the POS terminals 12, 14 and 16, where customers may be sold such aged food products.

Figure 2:
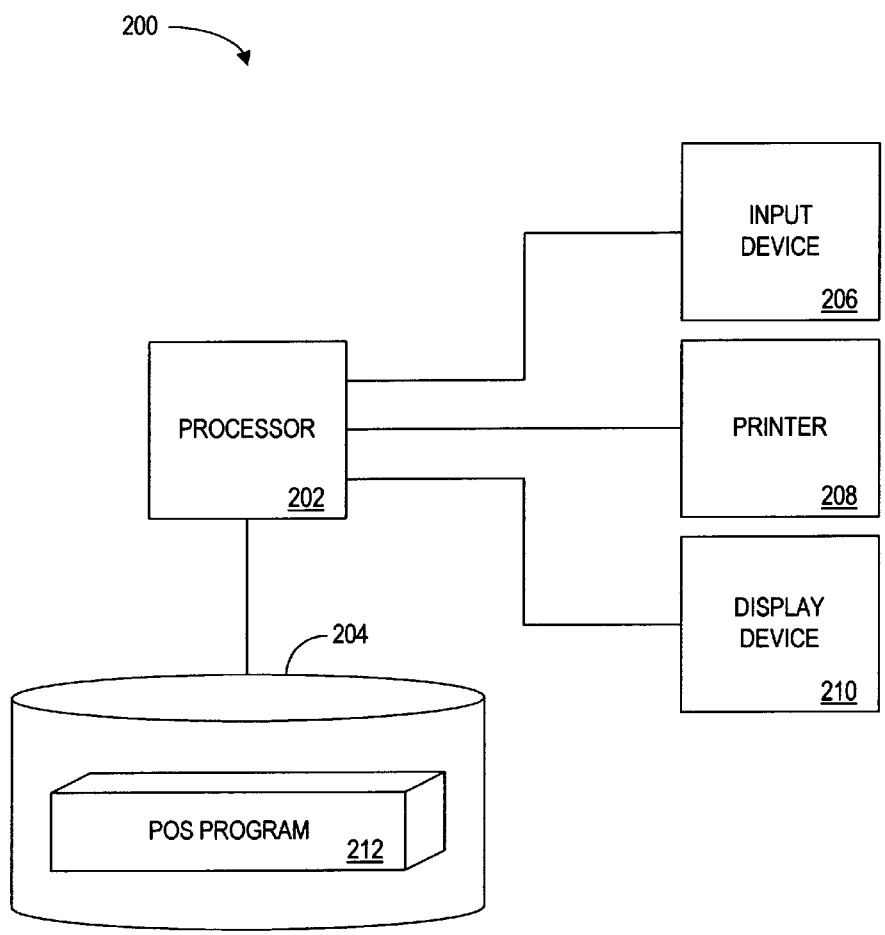
FIG. 2 is a schematic illustration of a POS terminal of the restaurant apparatus of FIG. 1.

FIG. 2 illustrates a POS terminal 200 that is descriptive of any or all of the POS terminals 12, 14 and 16 (FIG. 1). The POS terminal 200 comprises a processor 202, such as one or more conventional microprocessors. The processor 202 is in communication with a data storage device 204, such as an appropriate combination of magnetic, optical and/or semiconductor memory. The processor 202 and the storage device 204 may each be (i) located entirely within a single computer or other computing device; (ii) connected to each other by a remote communication medium, such as a serial port cable, telephone line or radio frequency transceiver; or (iii) a combination thereof. For example, the POS terminal 200 may comprise one or more computers that are connected to a remote server computer for maintaining databases.

An input device 206 preferably comprises a keypad for transmitting input signals, such as signals indicative of a purchase, to the processor 202. The input device 206 may also comprise an optical bar code scanner for reading bar codes and transmitting signals indicative of those bar codes to the processor 202. A printer 208 is for registering indicia on paper or other material, thereby printing waste receipts, sales receipts and coupons as controlled by the processor 202. A display device 210 is preferably a video monitor for displaying at least alphanumeric characters to the customer and/or cashier. Many types of input devices, printers and display devices are known to those skilled in the art, and need not be described in detail herein. The input device 206, printer 208 and display device 21 0 are each in communication with the processor 202.

The storage device 204 stores a POS program 212 for controlling the processor 202. The processor 202 performs instructions of the POS program 212, and thereby operates in accordance with the present invention, and particularly in accordance with the methods describe in detail herein. The POS program 212 furthermore includes program elements that may be necessary, such as an operating system and "device drivers" for allowing the processor 202 to interface with computer peripheral devices, such as the input device 206, the printer 208 and the display device 210. Appropriate device drivers and other necessary program elements are know to those skilled in the art, and need not be described in detail herein.

Figure 3:
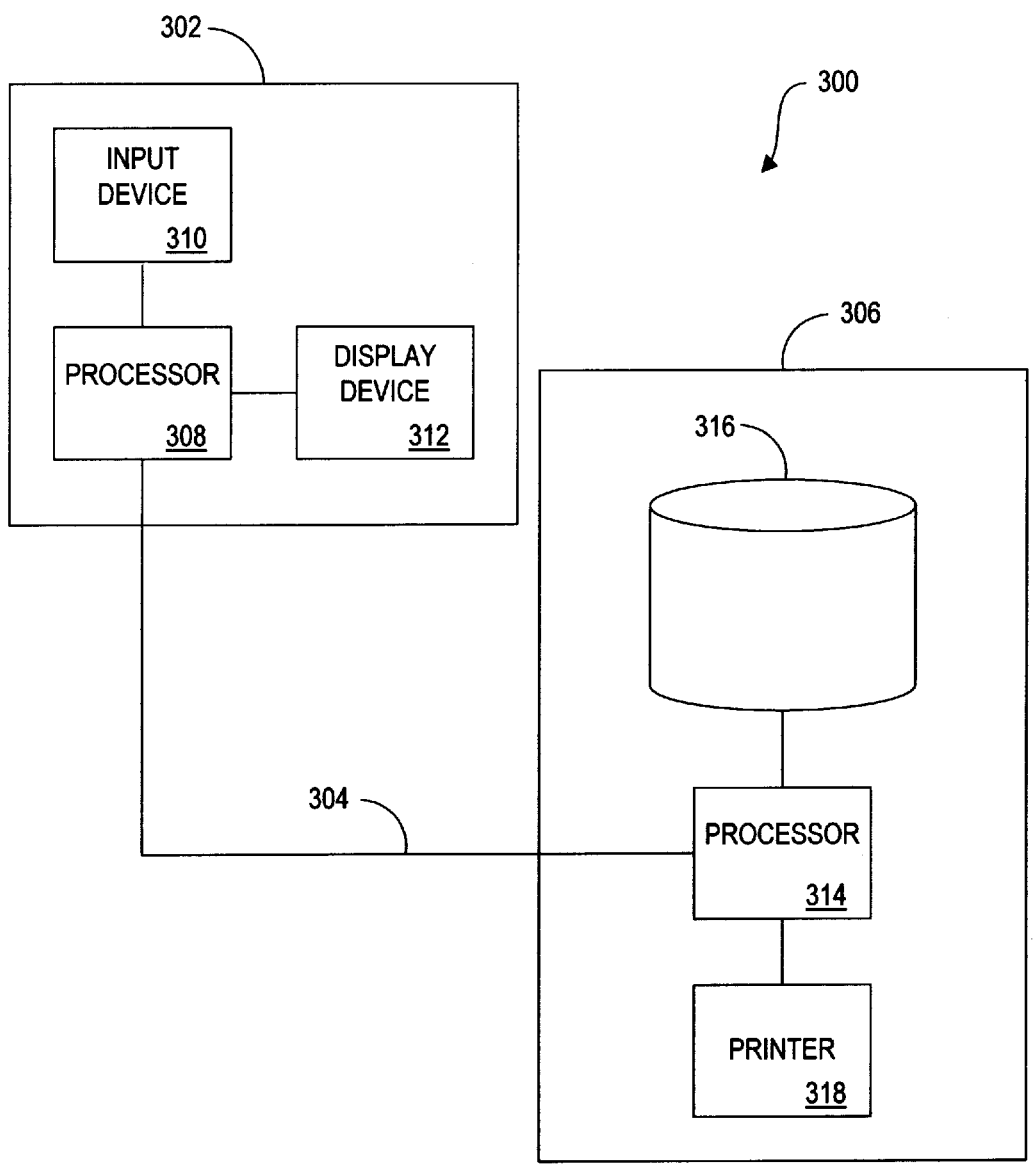
FIG. 3 is a schematic illustration of another embodiment of a POS terminal of the restaurant apparatus of FIG. 1.

FIG. 3 illustrates another embodiment of a POS terminal 300, in which a control device 302 is in communication via a communication medium 304 with a system 306 for providing an offer. The control device 302 comprises a processor 308 in communication with the input device 310 and the display device 312. The system 306 for providing an offer comprises a processor 314 in communication with the storage device 316 and the printer 318. In this embodiment, the control device 302 may be a cash register, and the system 306 may be an electronic device for printing coupons in accordance with data received from the cash register. Other configurations of the POS terminal 300 will be understood by those skilled in the art.

Figure 4:
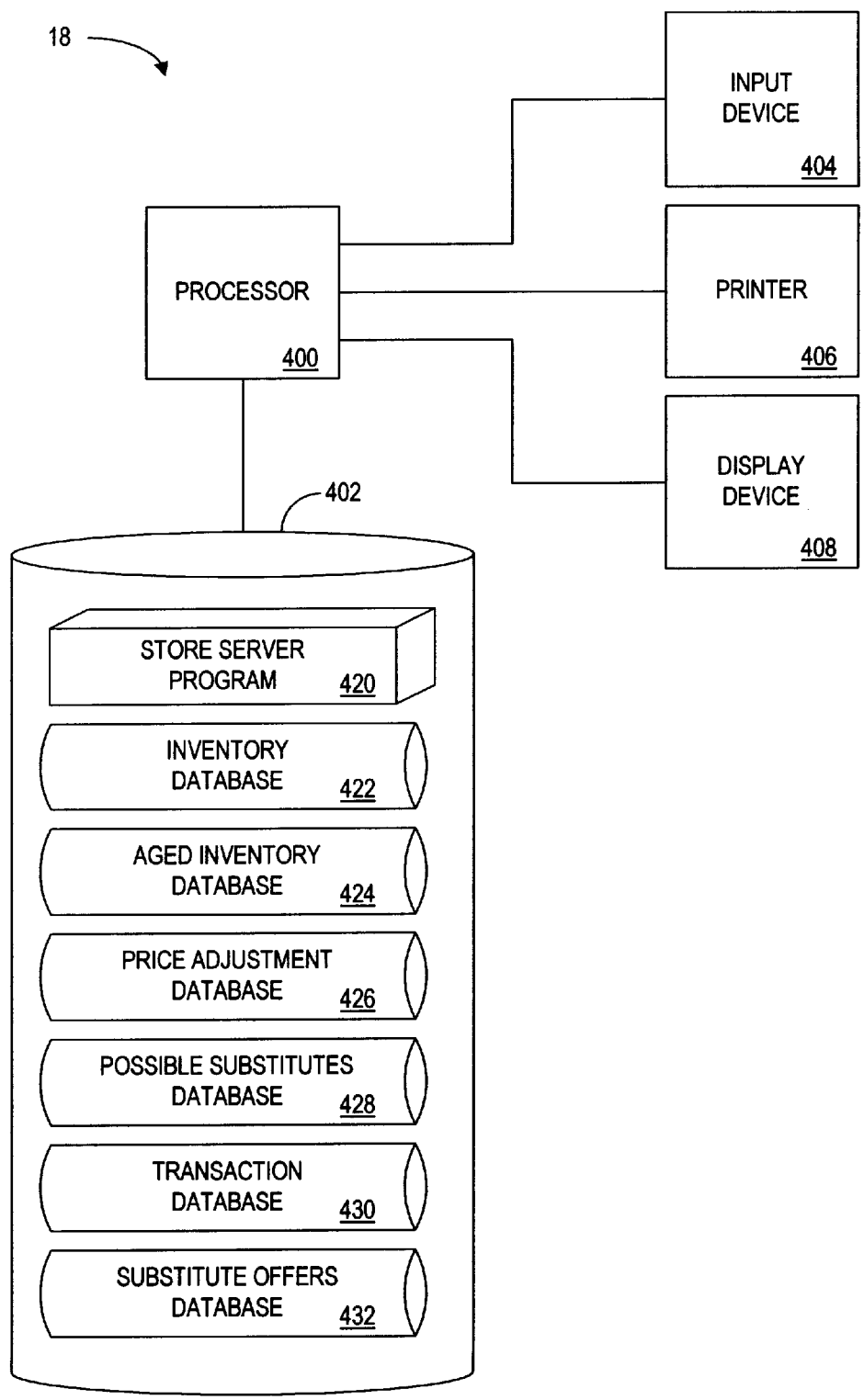
FIG. 4 is a schematic illustration of a store server of the restaurant apparatus of FIG. 1.

FIG. 4 illustrates the store server 18 (FIG. 1), which comprises a processor 400, such as one or more conventional microprocessors, such as the Intel Pentium® microprocessor. The processor 400 is in communication with a data storage device 402, such as an appropriate combination of magnetic, optical and/or semiconductor memory, as is apparent to those skilled in the art. The processor 400 and the storage device 402 may each be (i) located entirely within a single computer or other computing device; (ii) connected to each other by a remote communication medium, such as a serial port cable, telephone line or radio frequency transceiver; or (iii) a combination thereof. For example, the store server 18 may comprise one or more conventional computers that are connected to a remote server computer for maintaining databases.

An input device 404 preferably comprises a keypad for transmitting input signals to the processor 400. A printer 406 is for registering indicia on paper or other material, thereby printing reports and other documents as controlled by the processor 400. A display device 408 is preferably a video monitor for displaying at least alphanumeric characters. Many types of input devices, printers and display devices are known to those skilled in the art, and need not be described in detail herein. The input device 404, printer 406 and display device 408 are each in communication with the processor 400.

The storage device 82 stores a store server program 420 for controlling the processor 400. The processor 400 performs instructions of the store server program 420, and thereby operates in accordance with the present invention, and particularly in accordance with the methods described in detail herein. The store server program 420 furthermore includes program elements that may be necessary, such as an operating system and "device drivers" for allowing the processor 400 to interface with computer peripheral devices, such as the input device 404, the printer 406 and the display device 408. Appropriate operating systems, device drivers and other necessary program elements are known to those skilled in the art, and need not be described in detail herein.

The storage device 402 also stores (i) an inventory database 422, (ii) an aged inventory database 424, (iii) a price adjustment database 426, (iv) a possible substitute database 428, (v) a transaction database 430, and (vi) a substitute offers database 432. The databases 422, 424, 426, 428, 430 and 432 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides the tables shown. Similarly, the illustrated entries represent exemplary information, and those skilled in the art will understand that the number and content of the entries can be different from those illustrated herein.

Referring to FIG. 5, a table 500 represents an embodiment of the inventory database 422 (FIG. 4). The table 500 includes entries 502, 504, 506, 508, 510, 512 and 514, each defining a food product. It will be understood by those skilled in the art that the table 500 may include any number of entries. The table 500 also defines fields for each of the entries 502, 504, 506, 508, 510, 512 and 514, which specify (i) a food product identifier 520 that uniquely identifies the food product, (ii) a description 522 of the food product, (iii) a retail price 524 of the food product, and (iv) a cost 526 of the food product to the store selling the food product. Information stored in the inventory database 422 is available to the POS terminals 12, 14 and 16 (FIG. 1), so that any POS terminal may, for example, calculate a price of a purchase that includes one or more food products that are ordered. The information stored in the inventory database 422, particularly the selection of available food products and their retail prices, is typically established by a restaurant manager or other personnel.

Referring to FIG. 6, a table 600 represents a record of an embodiment of the aged inventory database 424 (FIG. 4). The aged inventory database 424 typically includes a plurality of such records, each record defining a food product and times when items of that food product have been assembled. The table 600 includes entries 602, 604, 606, 608, 610 and 612, each defining an item of a food product that has been assembled and that may have aged excessively. If a food product has aged excessively, it can be desirable to sell at a reduced price, rather than be discarded. The table 600 defines a food product identifier 620 that uniquely identifies the food product, and that corresponds to the food product identifier 520 (FIG. 5). The table 600 also defines a description 622 of the food product. The table 600 also defines fields for each of the entries 602, 604, 606, 608, 610 and 612, which specify (i) a time 624 when the item of the food product was assembled and made ready for sale, (ii) an age 625 of the item of the food product if it is available for sale, (iii) a time 626 when the item of the food product was sold or discarded, (iv) a status 628 of the item of the food product, and (v) a price 630, if any, for which the item of the food product was sold.

As described in the parent application, U.S. patent application Ser. No. 09/083,483, entitled "METHOD AND APPARATUS FOR SELLING AN AGING FOOD PRODUCT", filed May 22, 1998 (hereinafter "parent application"), an aged food product may be sold for an amount equal to a minimum price, or in another embodiment may be sold for an amount equal to or greater than the corresponding minimum price of the food product. Information stored in the aged inventory database 424 is available to the POS terminals 12, 14 and 16 (FIG. 1), so that any POS terminal may provide an indication of aged food products that are currently available for sale. The information stored in the aged inventory database 424 is typically established by the automated kitchen apparatus 20 (FIG. 1), as described in the parent application.

Figure 7:
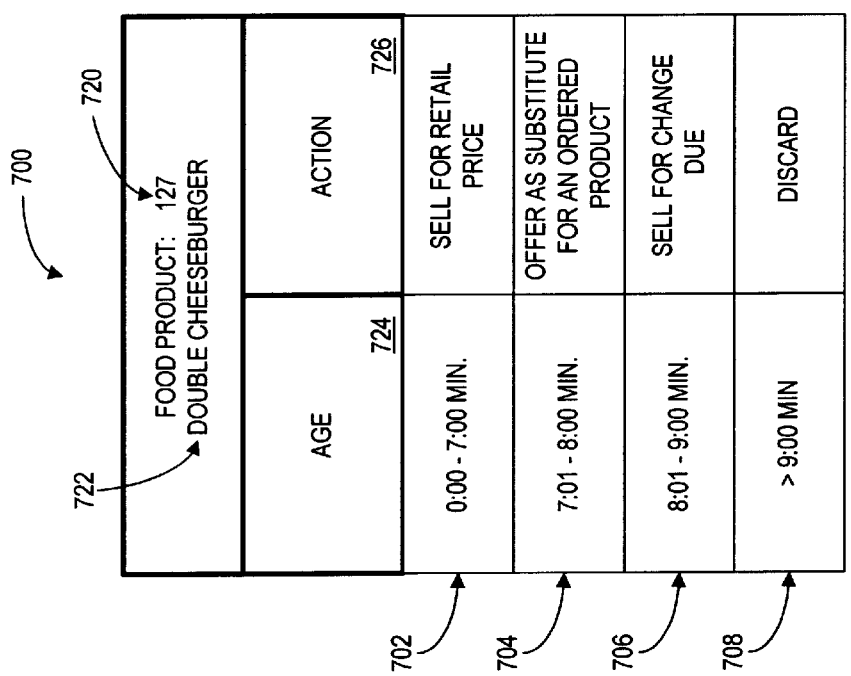
FIG. 7 is a schematic illustration of a record of an embodiment of a price adjustment database of the store server of FIG. 4.

Referring to FIG. 7, a table 700 represents a record of an embodiment of the price adjustment database 426 (FIG. 4). The price adjustment database 426 typically includes a plurality of such records, each record defining a food product and how that food product should be sold. The table 700 includes entries 702, 704, 706 and 708, each defining an age category of a food product and an action to take when an item of the food product is within that age category The table 700 defines a food product identifier 720 that uniquely identifies the food product, and that corresponds to the food product identifier 520 (FIG. 5). The table 700 also defines a description 722 of the food product. The table 700 also defines fields for each of the entries 702 704, 706 and 708, which specify (i) an age range 724 (age category), and (ii) an action 726 to take when an item of the food product is within the age range.

The action may be to sell the item for its retail price specified in the inventory database 424 (FIG. 4). This is preferable for items that have not aged significantly. Items that have aged moderately may be substituted for an ordered product, as described below. For example, it may be desirable to substitute a cheeseburger for an ordered hamburger if a cheeseburger has been assembled and has aged moderately. Items that have aged more significantly are in danger of becoming unsalable, so it is desirable to sell such products for change due, as described in the parent application and below. Items that have aged too much are discarded.

Figure 8:
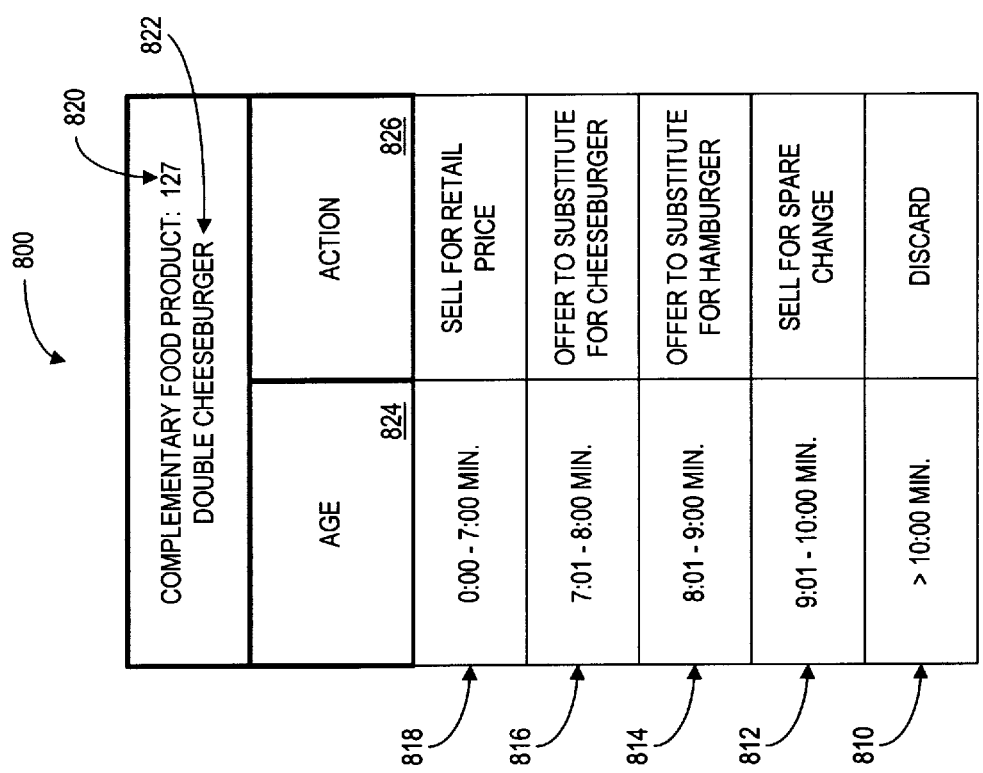
FIG. 8 is a schematic illustration of a record of another embodiment of the price adjustment database of the store server of FIG. 4.

Referring to FIG. 8, a table 800 represents a record of another embodiment of the price adjustment database 426 (FIG. 4). The price adjustment database 426 typically includes a record for each food product. The table 800 includes entries 802, 804, 806, 808 and 810, each defining an age category of the food product and an action to take when an item of the food product is within that age category. The table 800 defines a food product identifier 820 that uniquely identifies the food product, and that corresponds to the food product identifier 520 (FIG. 5). The table 800 also defines a description 822 of the food product. The table 800 also defines fields for each of the entries 802, 804, 806, 808 and 810, which specify (i) an age range 824 (age category), and (ii) an action 826 to take when an item of the food product is within the age range.

In contrast to the embodiment illustrated by the table 700 (FIG. 7), the table 800 indicates that a food product may be substituted for different ordered products depending on the age of the food product. For example, the entry 804 indicates that a moderately aged double cheeseburger may be substituted for an ordered cheeseburger, while the entry 806 indicates that more aged double cheeseburger may be substituted for an ordered hamburger. Thus, as a food product ages, it may be substituted for ordered food products having decreasing values.

Figure 9:
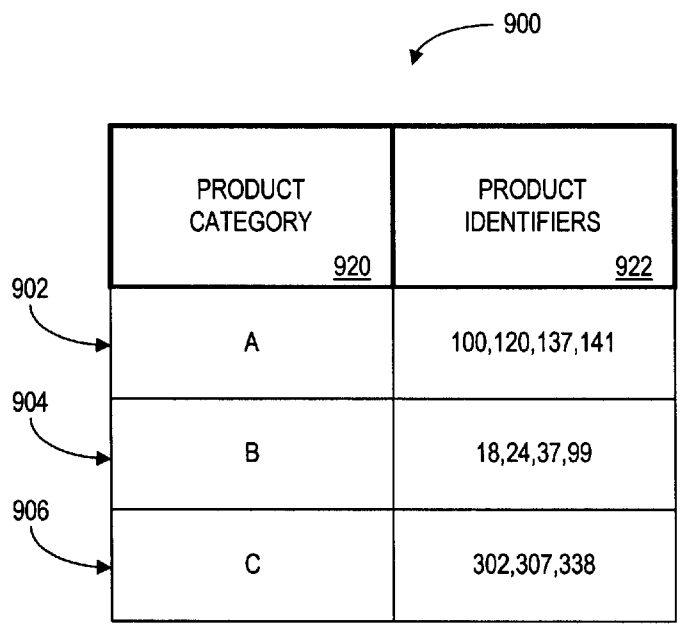

Referring to FIG. 9, a table 900 represents an embodiment of the possible substitute database 428 (FIG. 4). The table 900 includes entries 902, 904 and 906, each defining a category of food products. It will be understood by those skilled in the art that the table 900 may include any number of entries. The table 900 also defines fields for each of the entries 902, 904 and 906, which specify (i) a category identifier 920 that uniquely identifies the category of food products, and (ii) a food product identifiers 922 of the food products that are included in the food product category. In the embodiment illustrated by FIG. 9, any food product in a category may be substituted for an ordered product that is within the same category. For example, the entry 902 indicates that if food product "100" is ordered, food products "120", "137" or "141" may be substituted therefor.

Referring to FIG. 10, a table 1000 represents another embodiment of the possible substitute database 428 (FIG. 4). The table 1000 includes entries 1002, 1004 and 1006, each defining an ordered food product and food products which may be substituted therefor ("complementary food products"). It will be understood by those skilled in the art that the table 1000 may include any number of entries. The table 1000 also defines fields for each of the entries 1002, 1004 and 1006, which specify (i) an ordered food product identifier 1020 that uniquely identifies the food product, (ii) a description 1022 of the ordered food product, (iii) complementary food product identifiers 1024 that each uniquely identify complementary food products of the ordered food product, and (iv) descriptions 1026 of the complementary food products. In the embodiment illustrated by FIG. 10, any food product indicated by the field 102 of an entry may be substituted for an ordered product indicated by the field 1020 of that entry. For example, the entry 1002 indicates that if a "hamburger" is ordered, a "cheeseburger", "double cheeseburger" or "bigg burger" may be substituted therefor.

Referring to FIG. 11, a table 1100 represents another embodiment of the possible substitute database 428 (FIG. 4). The table 1100 includes entries 1102, 1104, 1106 and 1108, each defining a complementary food product and food products for which the complementary food product may be substituted. It will be understood by those skilled in the art that the table 1100 may include any number of entries. The table 1100 also defines fields for each of the entries 1102, 1104, 1106 and 1108, which specify (i) a complementary food product identifier 1120 that uniquely identifies the complementary food product, (ii) a description 1122 of the complementary food product, (iii) ordered food product identifiers 1124 that each uniquely identify ordered food products for which the complementary food product may be substituted, and (iv) descriptions 1126 of the ordered food products. In the embodiment illustrated by FIG. 11, the food product indicated by the field 1120 of an entry may be substituted for any ordered product indicated by the field 1124 of that entry. For example, the entry 1102 indicates that a "cheeseburger" may be substituted for an ordered "hamburger".

Figure 12:
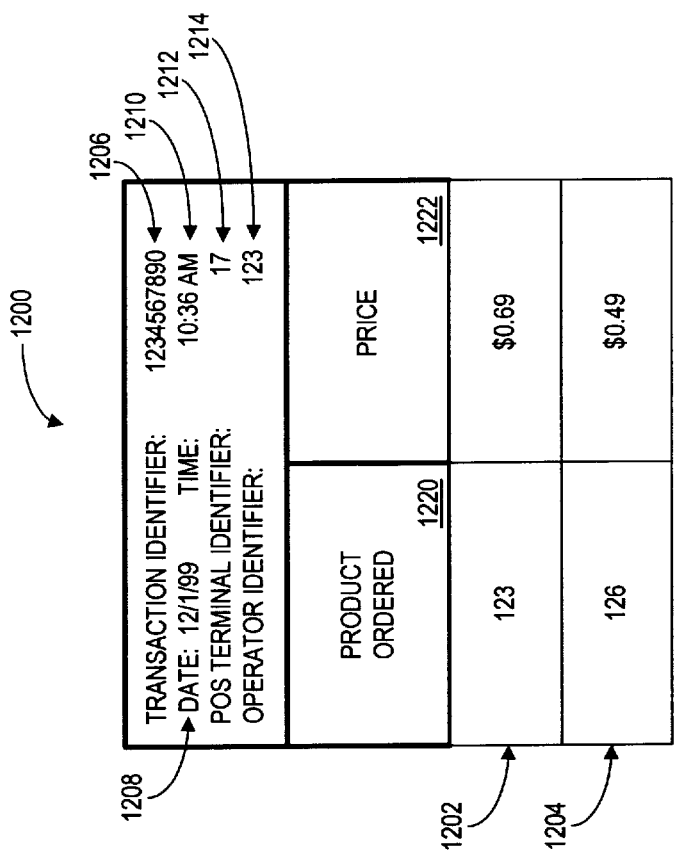
FIG. 12 is a schematic illustration of a record of an embodiment of a transaction database of the store server of FIG. 4.

Referring to FIG. 12, a table 1200 represents a record of an embodiment of the transaction database 430 (FIG. 4). The transaction database 430 typically includes a plurality of such records, each defining a transaction. The table 1200 includes entries 1202 and 1204, each defining a food product that is included in the transaction and thus is to be purchased by a customer. The table 1200 defines a transaction identifier 1206 that uniquely identifies the transaction, a date 1208 and a time 1210 when the transaction occurred, a POS terminal identifier 1212 that identifies the POS terminal involved in the transaction, and an operator identifier 1214 that uniquely identifies the operator of the POS terminal, such as a cashier. The table 1200 also defines fields for each of the entries 1202 and 1204, which specify (i) a product ordered 1220, and (ii) a price 1222 paid for the food product. The price paid for the food product may be the retail price of the food product, the retail price of another food product for which the food product was substituted, an amount of change due, or another amount.

Referring to FIG. 13, a table 1300 represents an embodiment of the substitute offers database 432 (FIG. 4). The table 1300 includes entries 1302, 1304, 1306 and 1308, each defining an offer to substitute a first food product for a second food product (e.g. a complementary food product for an ordered product). It will be understood by those skilled in the art that the table 1300 may include any number of entries. The table 1300 also defines fields for each of the entries 1302, 1304, 1306 and 1308, which specify (i) an offer identifier 1320 that uniquely identifies the offer, (ii) a transaction identifier 1322 that uniquely identifies the transaction during which the offer was provided to the customer, (iii) an ordered product identifier 1324 that identifies the product ordered by the customer, (iv) an offered product identifier 1326 that identifies the product offered to the customer as a substitution for the ordered product, and (v) an indication of whether the offer was accepted 1328 by the customer.

Figure 14:
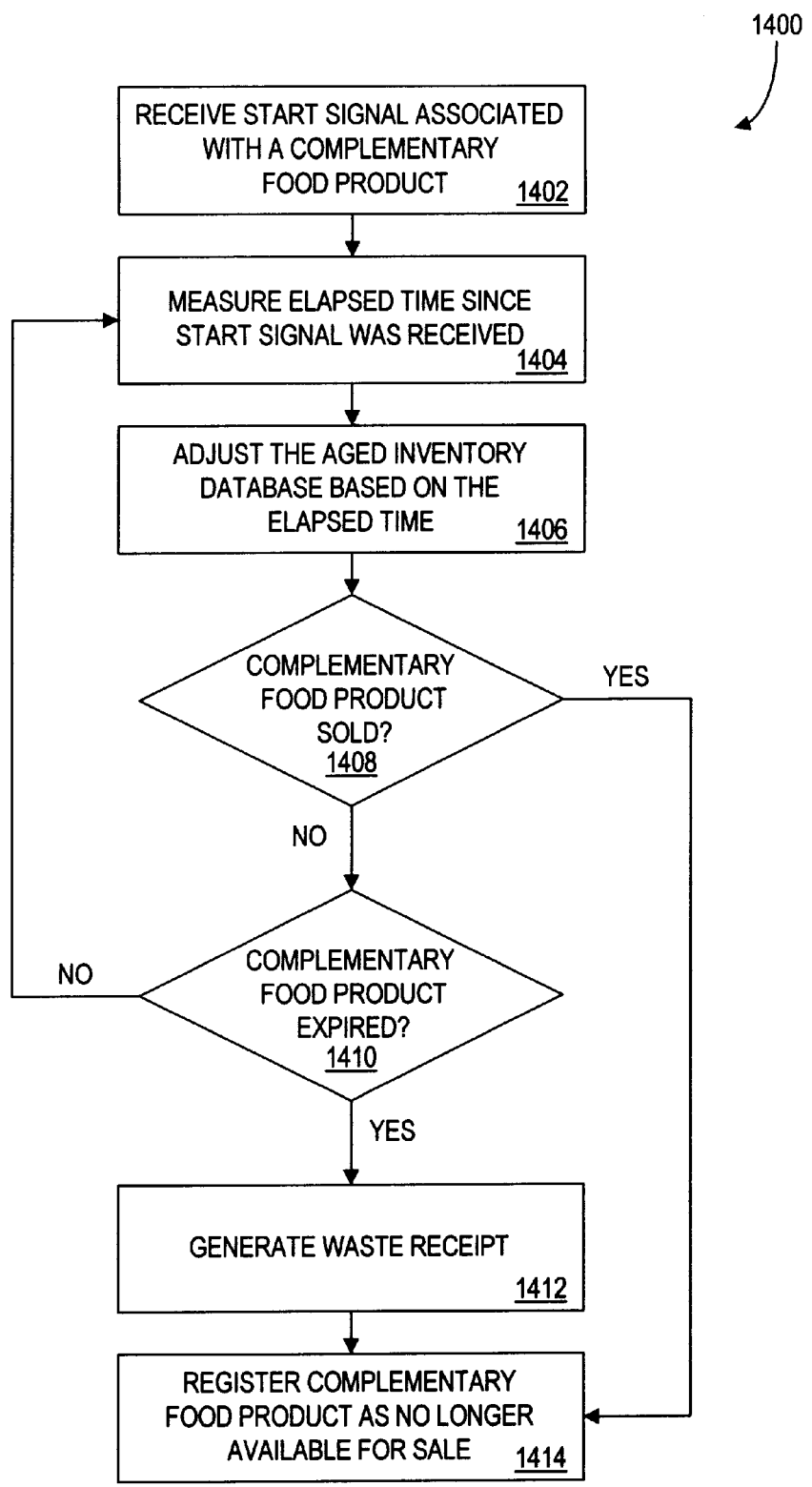
FIG. 14 is a flow chart illustrating a method for identifying aged food products that are desirable to substitute for an ordered product.

Referring to FIG. 14, a method 1400 for identifying aged food products that are desirable to substitute for an ordered product may be performed by the automated kitchen apparatus 20 (FIG. 1) and/or the store server 18 (FIG. 1), as appropriate. The time until expiration of each food product is first determined. One way of determining such a time is to receive a start signal for each food product (step 1402) and measure the corresponding elapsed time since the start signal was received (step 1404). When the start signal is received for a food product, an entry for the food product is created in the appropriate record of the aged inventory database 424 (FIG. 4). This entry, and particularly the corresponding "age" field, is adjusted to reflect the elapsed time (step 1406).

Based on the elapsed time, the time until expiration may be determined. For example, if hamburgers are deemed to expire twenty minutes after being placed in the warming bins 160 (FIG. 7), and the elapsed time is seven minutes, then the time until expiration is thirteen minutes (20−7=13). Alternative ways for determining the time until expiration will be readily understood, particularly with reference to the various possible formats described in the parent application.

If the food product is sold by substitution for an ordered product or added to a transaction and sold for change due to a customer (step 1408), then that food product is registered as no longer available for sale (step 1414). For example, the corresponding entry of the appropriate record of the aged inventory database 424 is adjusted to indicate that the item has been sold and the time when it was sold. If the food product is not sold, it is determined whether the food product has expired (step 1410). One way of determining whether a food product has expired is to determine whether the corresponding elapsed time is less than zero, or some other predetermined threshold. If not, the time until expiration of the food product continues to be measured by measuring the elapsed time (step 1404). If the food product has expired, then a waste receipt is generated (step 1412), and that food product is registered as no longer available for sale (step 1414). For example, the corresponding entry of the appropriate record of the aged inventory database 424 is adjusted to indicate that the item has been discarded and the time when it was discarded.

The POS terminals 12, 14 and 16 (FIG. I) have access to the aged inventory database 424, which describes food products that may have aged excessively. The POS terminals 12, 14 and 16 also have access to the price adjustment database 426, which defines price adjustments for food products at different ages (or age categories) of that food product. Accordingly, the POS terminals 12, 14 and 16 may determine which excessively aged food products are available, as well as when to provide offers to substitute those food products for ordered food products.

Figure 15:
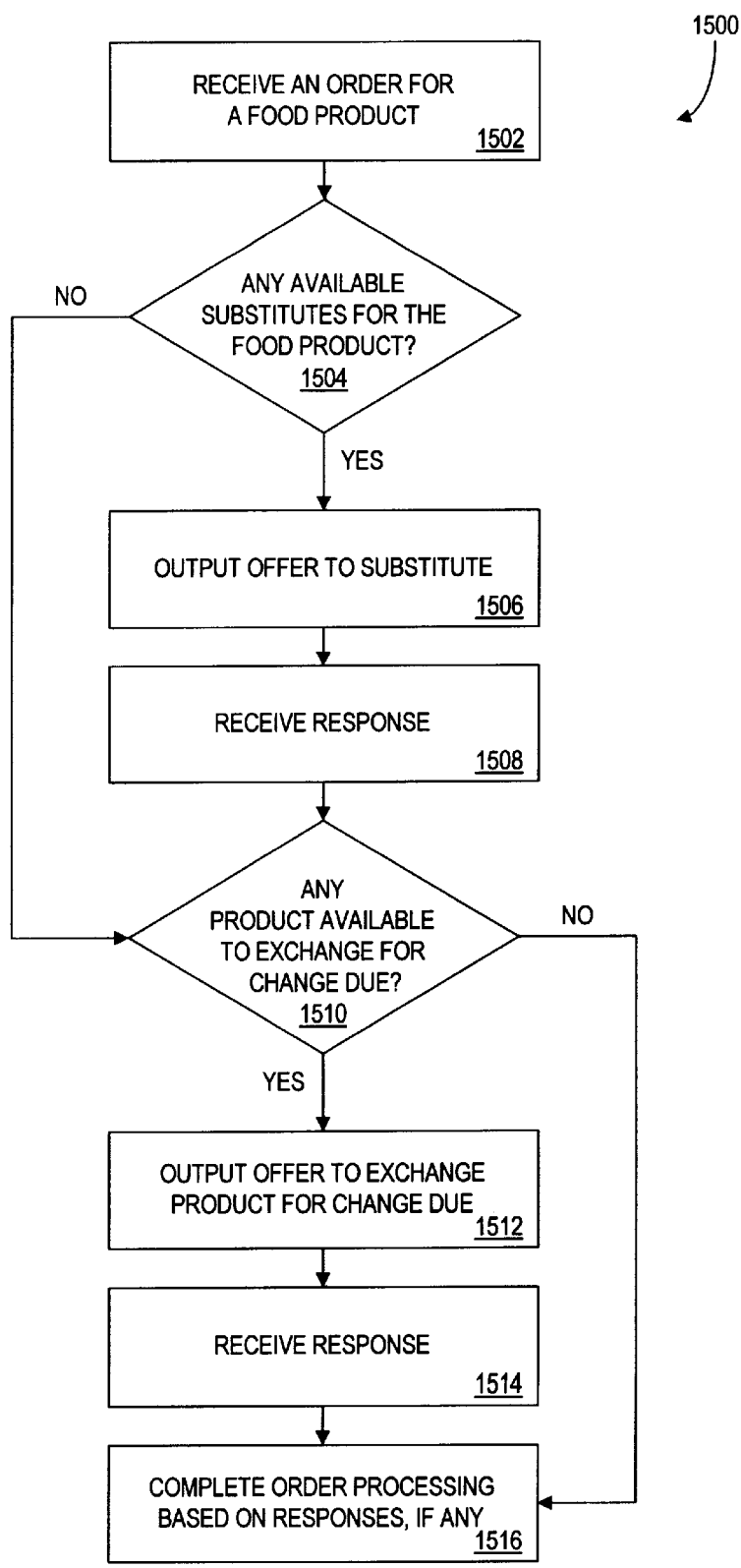
FIG. 15 is a flow chart illustrating a method for selling an aging food product.

FIG. 15 describes a method 1500 performed by a POS terminal of the restaurant apparatus 10 (FIG. 1) for selling an aging food product. The POS terminal receives an order for a food product (step 1502) during a transaction at the POS terminal. Many times an order includes a plurality of food products, and the method 1500 is likewise applicable to such orders. The POS terminal determines whether there are available substitutes for the ordered food product (step 1504). For example, the POS terminal may access data of the aged inventory database 424 (FIG. 4) to determine what aged food products are ready for sale. For each food product indicated by the aged inventory database 424, the POS terminal determines from the price adjustment database 426 whether the food product may be substituted. If more than one food product may be substituted, a food product may be, for example, selected at random or selected based on what the customer has ordered.

If there is an available substitute (i.e. a complementary product) for the ordered food product, the POS terminal outputs an offer to substitute the complementary product for the ordered food product (step 1506). The offer may be displayed as a textual message on a display device of the POS terminal and viewed by the customer or viewed by the operator who in turn reads the text to the customer. The customer provides a response to the offer, and the response is received by the POS terminal (step 1508). Typically, the operator will actuate a key of the POS terminal input device in order to indicate acceptance or rejection of the offer.

The POS terminal determines whether there arc available food products to exchange for change due (step 1 510). For example, the POS terminal may access data of the aged inventory database 424 (FIG. 4) to determine what aged food products are ready for sale. For each food product indicated by the aged inventory database 424, the POS terminal determines from the price adjustment database 426 whether the food product may be sold for change due. If more than one food product may be sold for change due, a food product may be, for example, selected at random or selected based on what the customer has ordered.

If there is a food product available that may be sold for change due, the POS terminal outputs an appropriate offer (step 1512). The offer may be displayed as a textual message on a display device of the POS terminal and viewed by the customer or viewed by the operator who in turn reads the text to the customer. The customer provides a response to the offer, and the response is received by the POS terminal (step 1514). Typically, the operator will actuate a key of the POS terminal input device in order to indicate acceptance or rejection of the offer.

Based on the received responses, if any, the POS terminal completes processing of the received order (step 1516). For example, if the customer accepted an offer to substitute a first product for a second product, then in the record defining the transaction an entry indicating the second product would be substituted with an entry indicating the first product. Similarly, if the customer accepted an offer to purchase a third product for change due, then in the record defining the transaction an entry indicating the third product would be added.

Figure 16:
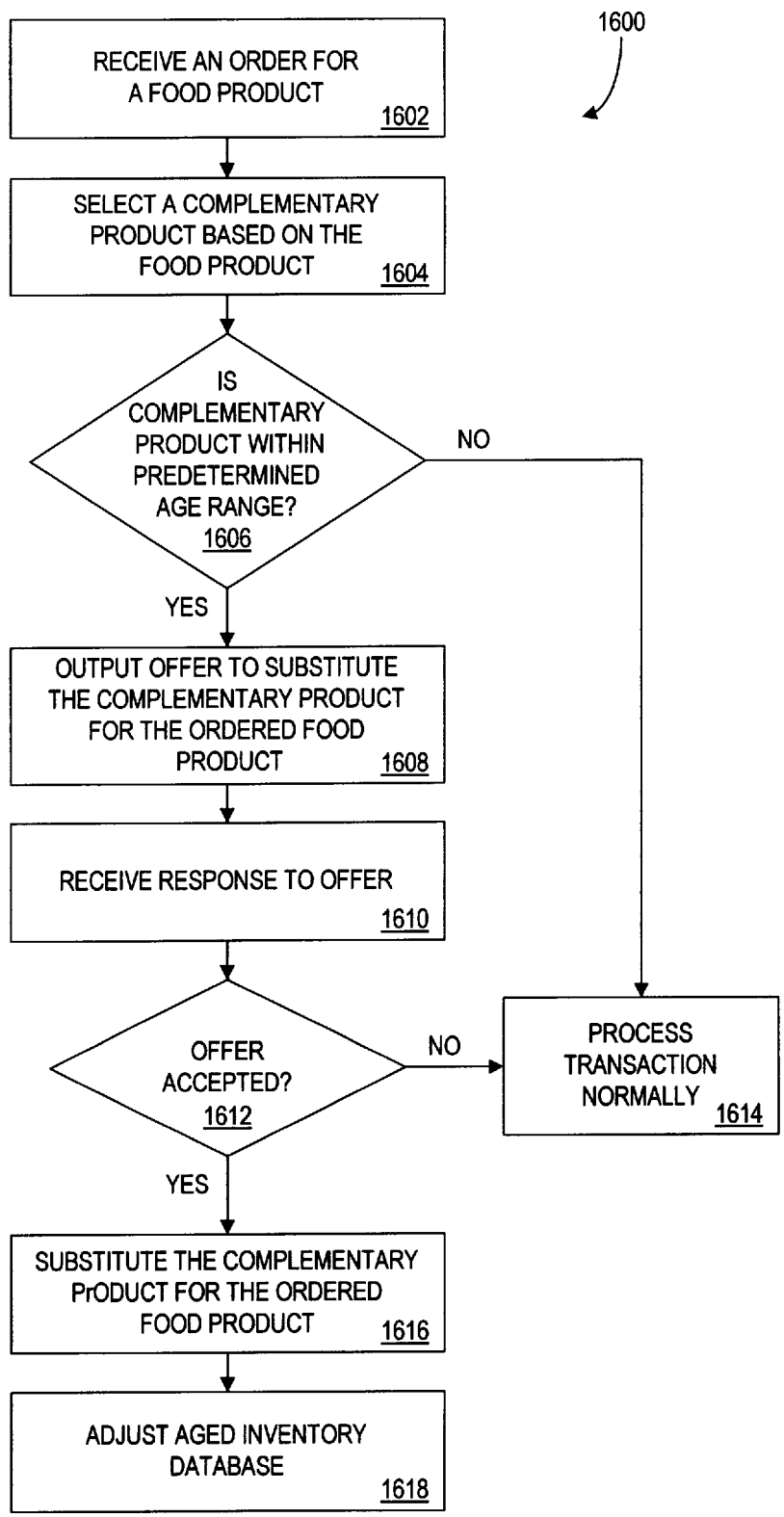
FIG. 16 is a flow chart illustrating a method for selling an aging food product by substituting it for an ordered food product.

FIG. 16 describes a method 1600 performed by a POS terminal of the restaurant apparatus 10 (FIG. 1) for selling an aging food product by substituting it for an ordered food product. The POS terminal receives an order for a food product (step 1602) during a transaction at the POS terminal. Many times an order includes a plurality of food products, and the method 1600 is likewise applicable to such orders. The POS terminal selects a complementary food product based on the ordered food product (step 1604). For example, the POS terminal may access data of the possible substitutes database 428 (FIG. 4) to find one or more complementary food products. The POS terminal also determines if the complementary food product has an age within a predetermined age range (step 1606). F or example, the POS terminal may access data of the aged inventory database 424 (FIG. 4) to determine whether the complementary food product is ready for sale. If so, the POS terminal determines from the price adjustment database 426 whether the complementary food product may be substituted for the ordered food product.

If the complementary food product has an age within the predetermined age range, the POS terminal outputs an offer to substitute the complementary food product for the ordered food product (step 1608). The offer may be provided (i) immediately after the POS terminal operator enters an indication of the food product into the POS terminal, or (ii) after all food products of an order have been entered and the POS terminal has been instructed to calculate an order price. A response to the offer is received from the customer (step 1610). If the offer is not accepted by the customer (step 1612), the operator may so indicate via a device (e.g. the input device of the POS terminal) that transmits a "rejected" signal to the POS terminal. Then the transaction is processed normally (step 1614).

If the offer is accepted by the customer, the operator may so indicate via a device (e.g. the input device of the POS terminal) that transmits An acceptance signal to the POS terminal. The complementary food product is substituted for the ordered product (step 1616). Typically, such substitution includes deleting the food product from the order and adding the complementary product to the order. The complementary product may be added to the order for price of the food product. Thus, the customer pays the price of the ordered product, yet receives the complementary product, which typically has a higher retail price and perceived value. However, in an alternate embodiment the order price of the order is increased by a predetermine surcharge in return for the substitution of the complementary product. Thus, the customer would pay the price of the ordered product plus the surcharge in return for the substitution of the complementary product. The surcharge may be fixed for any substitution, or may be based on, for example, the age of the complementary product or the amount of change due.

The aged inventory database 424 is appropriately adjusted (step 1618) to reflect the sold complementary food product. For example, the complementary food product is registered as having been sold and no longer available, and the time of the sale may be indicated in the appropriate entry of the appropriate record.

The parent application describes a method and apparatus which may be advantageously used to allow customers to purchase aged inventory for their change due. In particular, since customers generally do not know which food products are aged, it is difficult or impossible for customers to predict which food products will be offered to them. Accordingly, there is a significant randomness in the offers, which prevents customers from successfully taking advantage of the offering process.

Figure 17A:
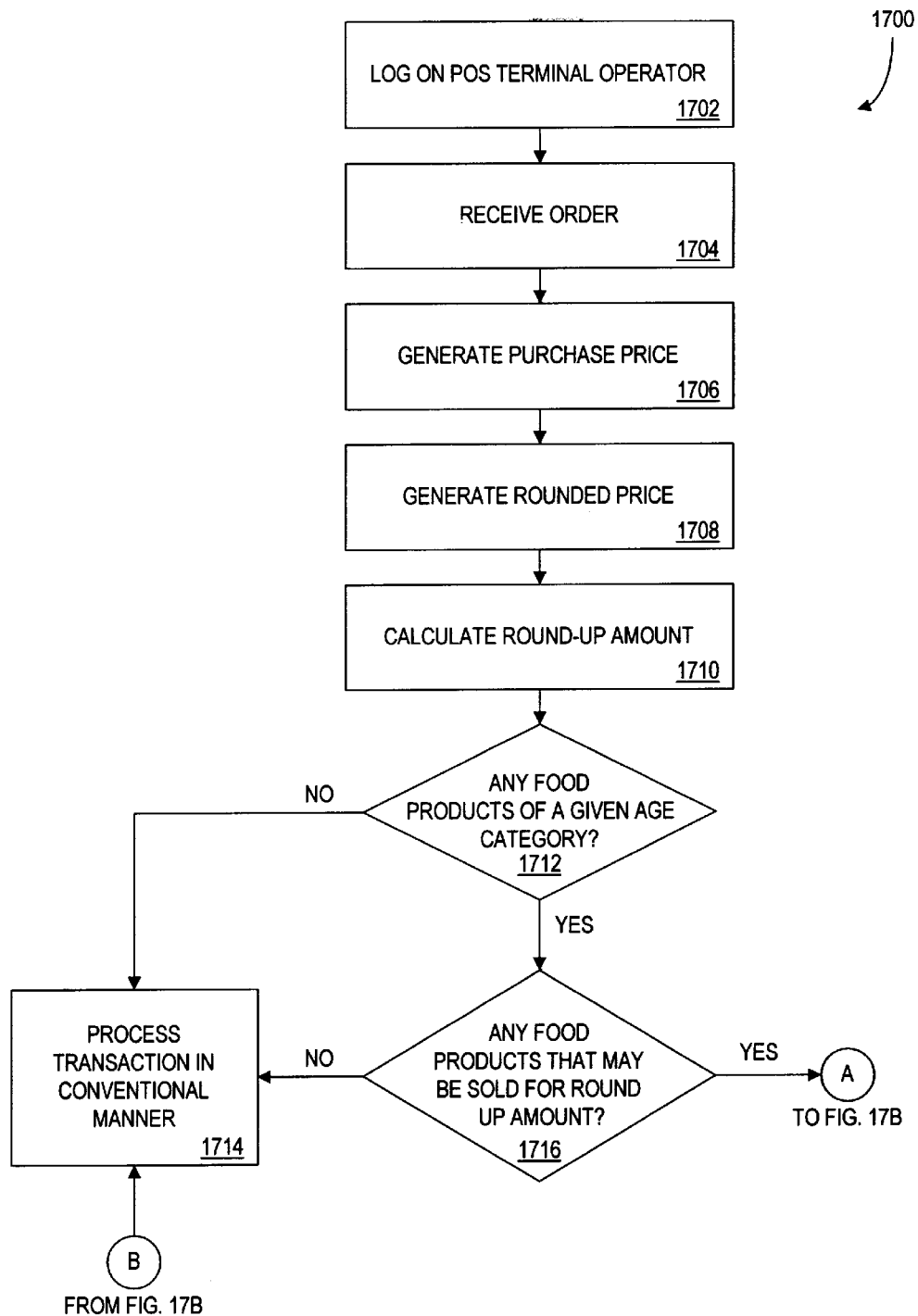
FIGS. 17A and 17B is a flow chart illustrating a method for selling an aging food product.
Figure 17B:
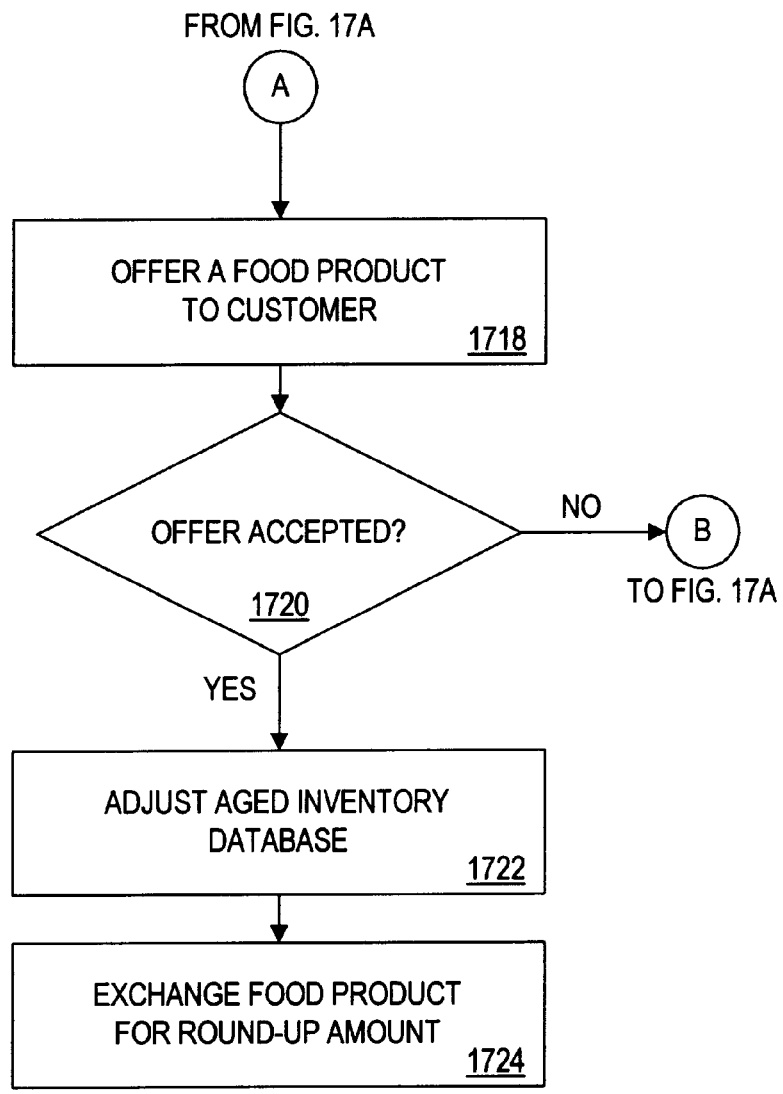

FIGS. 17A and 17B describe a method 1700 performed by a POS terminal of the restaurant apparatus 10 (FIG. 1) for selling an aging food product. The POS terminal logs on a POS terminal operator (e.g. a cashier) (step 1702), which is typically performed once when an operator begins or resumes operation of the POS terminal (i.e. at the beginning of the operator's shift or after he has returned from a break). Logging on includes inputting into the POS terminal a unique operator identifier. Thus, subsequent operations performed by or on the POS terminal may be associated with the operator. Benefits to such operating tracking are described in the parent application.

The POS terminal receives an order (step 1704) and generates a purchase price (also known as an order price) for the order (step 1706). For example, the purchase price is typically calculated as the sum of the retail prices of the products included in the order plus any applicable taxes. A rounded price is generated (step 1708) and a round-up amount is calculated (step 1710) as described in the parent application. If there are not any food products of a predetermined age category (step 1712), (e.g. food products indicated by the price adjustment database as corresponding to an age category "SELL FOR CHANGE DUE"), then the transaction is processed in a conventional manner (step 1714). Otherwise, the POS terminal determines if there are any food products that may be sold for the round-up amount calculated in step 1710 (step 1716). If so, then the customer is provided with an offer to purchase the food product for the round-up amount (step 1718).

If the offer is accepted (step 1720), then the aged inventory database 424 is adjusted accordingly (step 1722) and the food product is exchanged for the round-up amount (step 1724). The POS terminal may determine that the offer has been accepted by actuation of a key on the input device of the POS terminal. Alternatively, a bar code scanner of the POS terminal may scan a bar code on the food product, and this scanning generates a signal that indicates acceptance of the offer. In another embodiment, the offer may be automatically considered accepted (or rejected) if no response is entered within a predetermined time after the offer has been made. Such automatic acceptance/rejection is described in detail below with reference to FIGS. 19 and 20.

An order including a set of products defines an order price. Some such orders result in low amounts of change due. For example, if an order has an order price $4.97, the amount of change may be $0.03 if the order price is rounded to the nearest $1.00. Thus, the low amount of change due restricts the number of food products that may be offered to a customer in exchange for his change due. Accordingly, it is advantageous to maintain high amounts of change due for orders. The method and apparatus of the present invention may be used to maintain high amounts of change due, as described below with reference to FIGS. 18A, 18B and 18C.

Figure 18A:
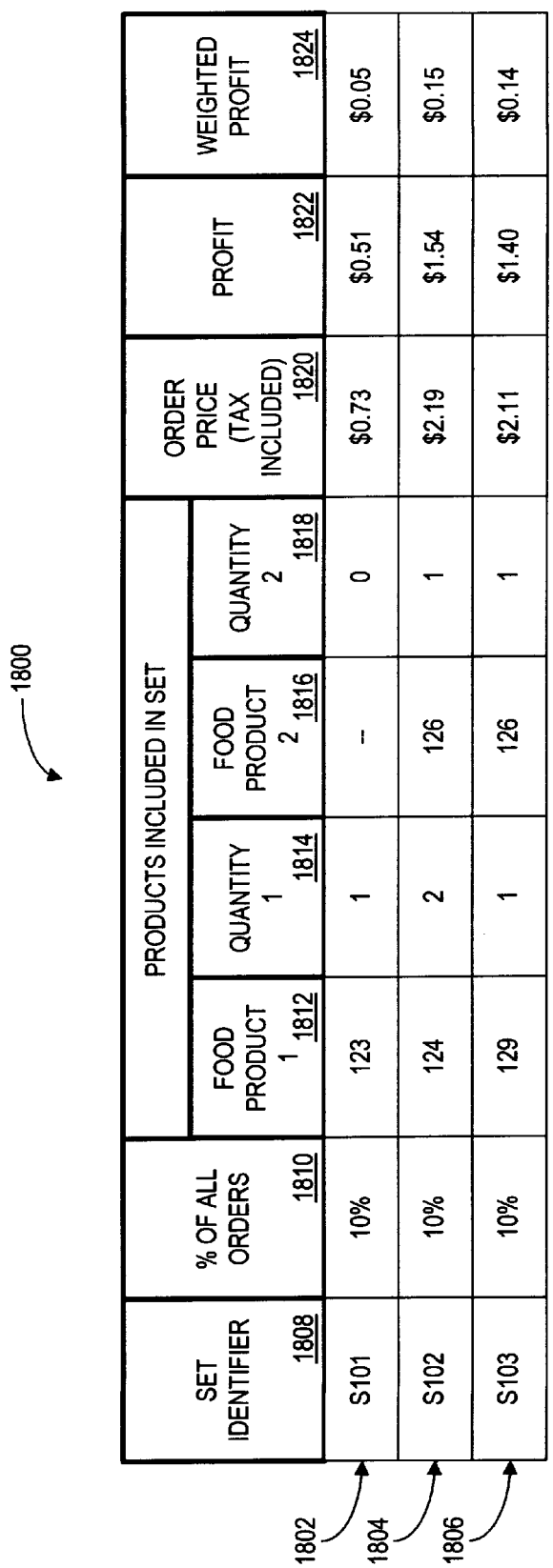
FIG. 18A is a record of another embodiment of the transaction database of the store server of FIG. 4.

Referring to FIG. 18A, a table 1800 represents a record of another embodiment of the transaction database 430 (FIG. 4). The table 1800 includes entries 1802, 1804 and 1806. Each entry defines a previous order and the profitability of that order. In particular, the table 1800 represents a historical compilation of similar transactions. It will be understood by those skilled in the art that the table 1800 may include any number of entries. It may be desirable to include only those entries that represent a significant number of orders, such as only those orders that account for more than five per cent of all orders. The table 1800 also defines fields for each of the entries 1802, 1804 and 1806, which specify (i) a set identifier 1808 that uniquely identifies the set of products, (ii) a percentage 1810 of all orders that the order represents, (iii) a first food product 1812 included in the set, (iv) a quantity 1814 of the first food product, (v) a second food product 1816 included in the set, (vi) a quantity 1818 of the second food product, (vii) an order price 1820 which includes taxes, (viii) a profit 1822 of the order which may be calculated by subtracting taxes and costs of the food products in the set, (ix) a weighted profit 1824 which may be calculated as the product of the profit and the percentage of all orders. Although only two food product fields and quantities are shown in the table 1800, any number may be included.

Figure 18B:
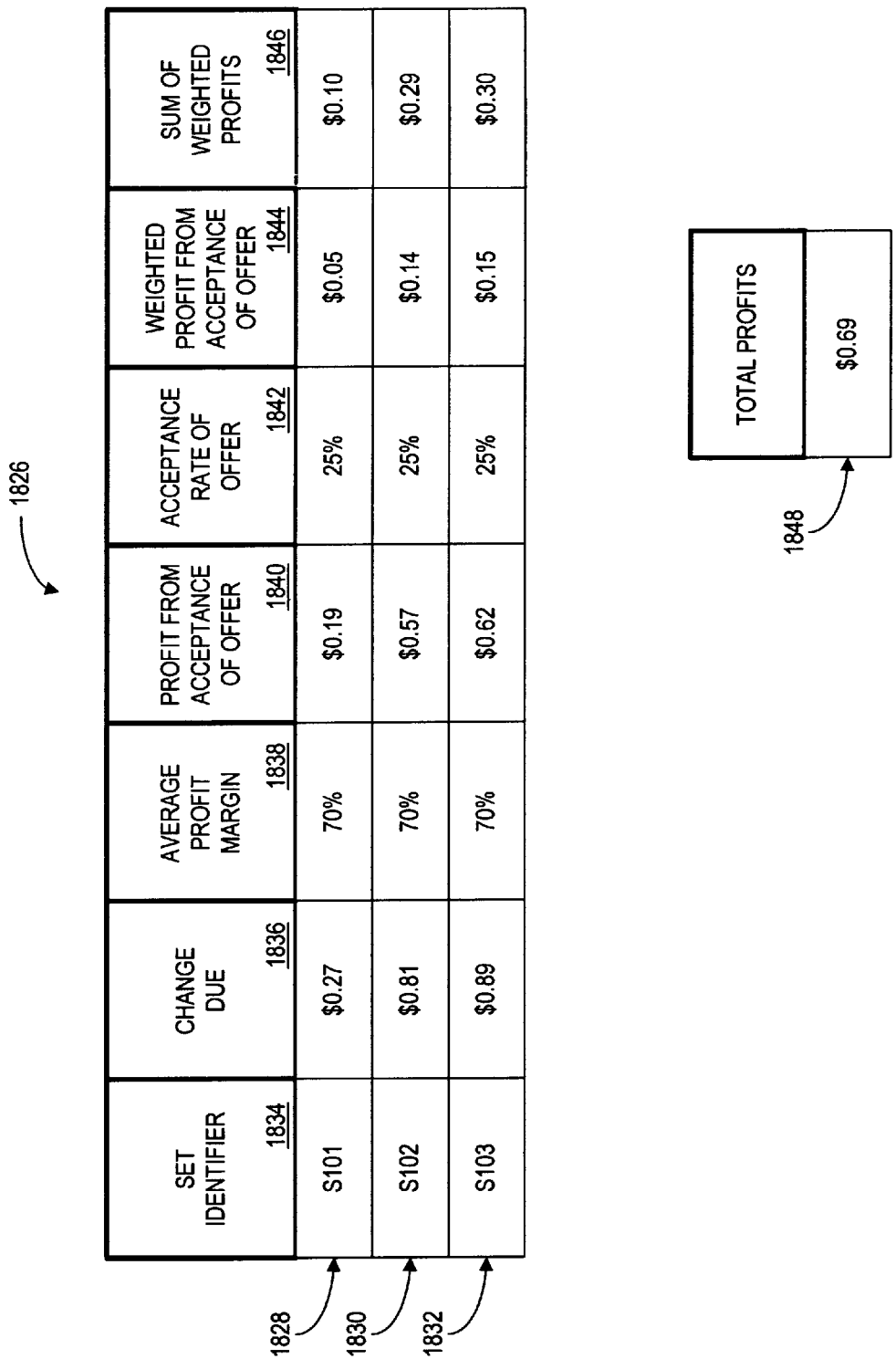
FIG. 18B is another record of the transaction database of the store server of FIG. 4.

Referring to FIG. 18B, a table 1826 represents another record of the transaction database 430 (FIG. 4) which complements the record 1800 (FIG. 18A). The table 1826 includes entries 1828, 1830 and 1832. Each entry defines a previous order and the profitability from an accepted offer provided in conjunction with the order. The table 1826 also defines fields for each of the entries 1828, 1830 and 1832, which specify (i) a set identifier 1834 corresponding to a set identifier 1808 of the table 1800 (FIG. 18A); (ii) a change due 1836 which may be calculated as the amount to round the corresponding order price 1820 (FIG. 18A) of the set up to the next whole dollar price; (iii) an average profit margin 1838 of products given in exchange for change due; (iv) a profit 1840 from acceptance of the offer, which may be calculated as the product of the change due 1836 and the average profit margin 1838; (v) an average acceptance rate 1842 of the offer; (vi) a weighted profit 1844 from acceptance of the offer, which may be calculated as the product of the profit from acceptance 1840 and the acceptance rate 1842; (vii) a sum of weighted profits 1846, which may be calculated as the sum of the weighted profit from acceptance 1844 and the weighted profit 1824 of the order. Also included in the record is a sum 1848 of all the sums of weighted profits 1846. The sum 1848 represents the average profit that the business seeks to maximize as described below.

Figure 18C:
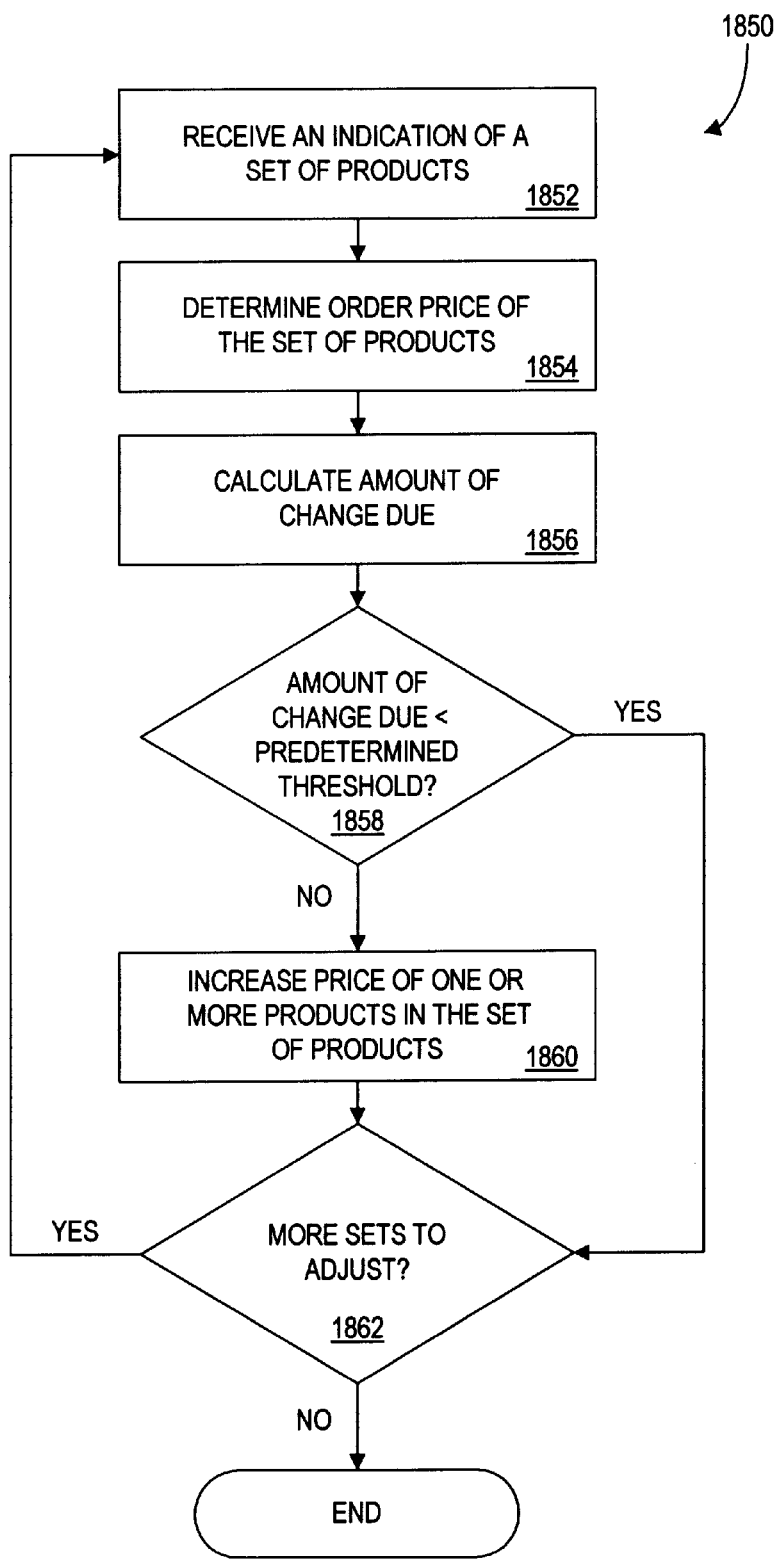
FIG. 18C is a flow chart illustrating a method for setting prices of products to adjust amounts of change due on popular orders.

FIG. 18C describes a method 1850 performed by a POS terminal of the restaurant apparatus 10 (FIG. 1) for setting prices of products to adjust amounts of change due on popular orders. The method 1850 is typically performed periodically (e.g. every month) by analyzing sets of products defined by the tables 1800 (FIG. 18A) and 1826 (FIG. 18B). The method 1850 is performed to maximize the sum 1848 (FIG. 18B) and may be iterated a predetermined number of times to find a maximal sum. Popular orders, for example orders that account for more than 10% of all orders, are analyzed to adjust their corresponding order prices.

An indication of a set of products is received (step 1852). The set of products defines an order price which the POS terminal determines (step 1854). The amount of change due for the order is calculated (step 1856). If the amount of change due is less than a predetermined threshold (e.g. less than ten cents) (step 1858), then the retail price of one or more products in the set of products is adjusted (step 1860). Thus, the retail price and the resulting amount of change due are adjusted. Typically, the adjustment is calculated so the resulting amount of change due (after adjustment) is above a second predetermined threshold (e.g. above thirty cents). If there are more sets of products to adjust (step 1862), then that set is likewise processed.

Referring to FIG. 19, a table 1900 represents a database which may be stored in the store server 18 (FIG. 1) in an embodiment of the present invention in which offers may be automatically accepted and/or rejected. The table 1900 includes entries 1902, 1904 and 1906. Each entry defines a type of offer and an action to perform if a response to the offer is not received within a predetermined time. The table 1900 also defines fields for each of the entries 1902, 1904 and 1906, which specify (i) a type of offer 1920, (ii) a time 1922 to maintain the offer, and (iii) an action to take after the time 1922 elapses. Many other types of offers besides those shown in the table 1900 may be used.

Figure 20:
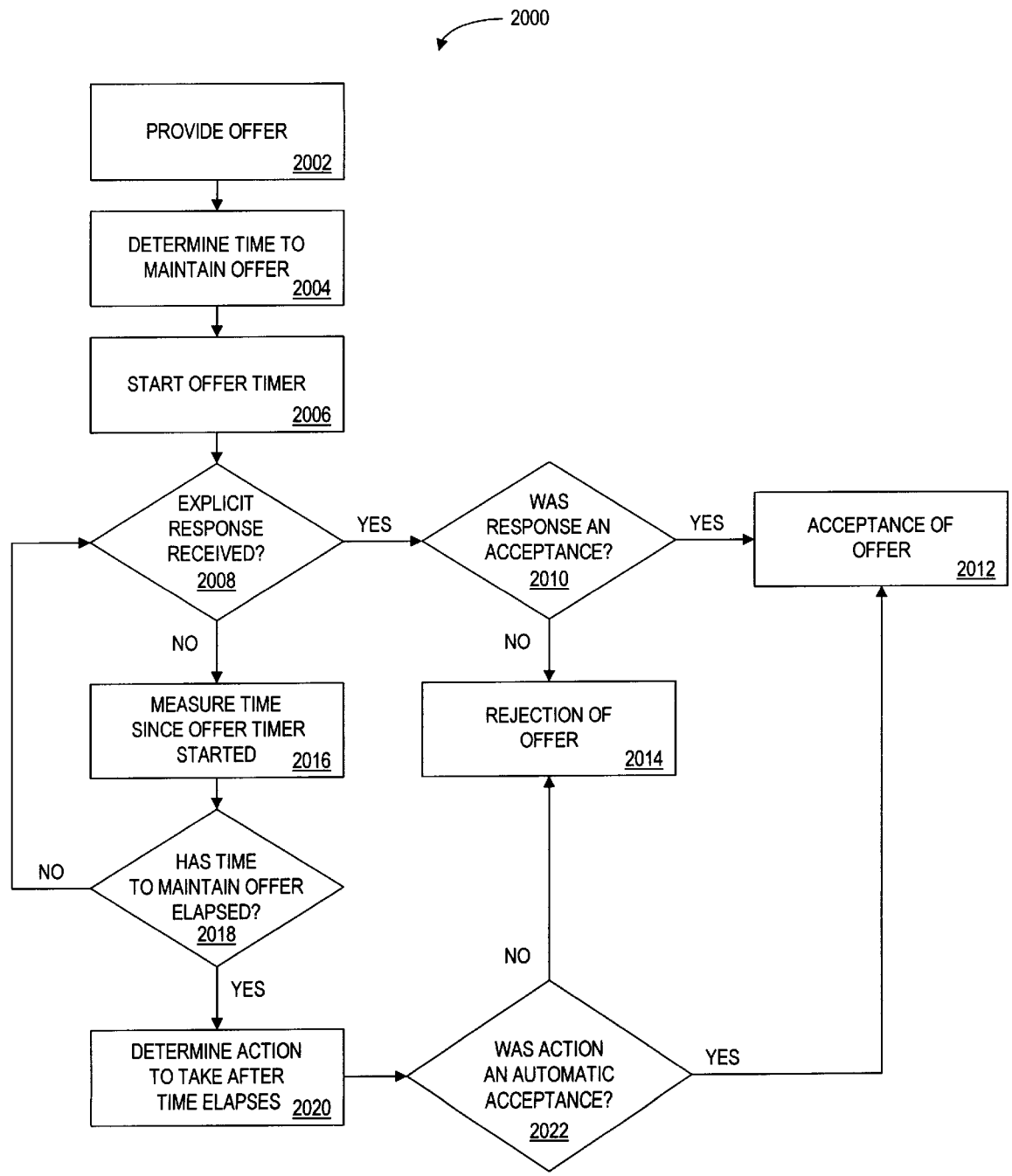
FIG. 20 is a flow chart illustrating a method for automatic acceptance of an offer

FIG. 20 describes a method 2000 performed by a POS terminal of the restaurant apparatus 10 (FIG. 1) for automatic acceptance of an offer. When the offer is provided (step 2002), the POS terminal determines the time to maintain the offer (step 2004). For example, the table 1900 provides an indication of such times. In addition, such times may be adjusted based on the activity rate of the POS terminal. For example, it may be desirable to reduce the time to maintain the offer if there are several other customers waiting in line behind the current customer. Measurements of activity rates and corresponding adjustments based on such rates a described in commonly-owned U.S. patent application Ser. No. 09/045,386, entitled METHOD AND APPARATUS FOR CONTROLLING THE PERFORMANCE OF A SUPPLEMENTARY PROCESS AT A POINT-OF-SALE TERMINAL (Attorney Docket No. WD2-97-557), filed Mar. 20, 1998, the entirety of which is incorporated herein by reference as part of the present disclosure.

An offer timer is started (step 2006) to provide a measurement of the time since the offer was provided. The offer timer may be a simple software subroutine that periodically compares the current time with the time the offer was provided. If an explicit response to the offer is received (step 2008), then it is determined whether the response indicates acceptance of the offer (step 2010). If so, then the acceptance of the offer is processed (step 2012) as described above and in the parent case. Otherwise, the rejection of the offer is processed (step 2014).

If no explicit response is received, the POS terminal measures the time since the offer timer was started (step 2016). If the time to maintain the offer has not yet elapsed (step 2108), then the POS terminal continues to await an explicit response (step 2008). If the time has elapsed, then the POS terminal determines what action to take (step 2020). For example, the table 1900 provides an indication of such actions. If it is determined that the action is an automatic acceptance(step 2022), then the acceptance of the offer is processed (step 2012) as described above and in the parent case. Otherwise, the rejection of the offer is processed (step 2014).

Although the present invention has been described with respect to a preferred embodiment thereof, those skilled in the art will note that various substitutions may be made to those embodiments described herein without departing from the spirit and scope of the present invention. For example, although the above description describes a quick service restaurant embodiment of the present invention, those skilled in the art will understand that the invention is likewise applicable to other environments, such as vending machines. In addition, some steps described as being performed by a POS terminal may be performed by the store controller, and vice versa.

What is claimed is:

1. A computer based method for selling an aging food product, comprising:

receiving an order for a food product;

selecting a complementary product based on the food product, the complementary product having an age within a predetermined age range;

outputting an offer to substitute the complementary product for the food product;

receiving a response to the offer; and selling the complementary product in place of the food product if the response indicates acceptance of the offer.

2. The method of claim 1, in which the step of selecting a complementary product comprises:

identifying a complementary product that has been assembled.

3. The method of claim 1, in which the step of selecting a complementary product comprises:

accessing a first database to determine a complementary product that corresponds to the food product.

4. The method of claim 3, further comprising:

accessing a second database to determine whether the complementary product has an age within the predetermined age range.

5. The method of claim 1, further comprising:

determining if the food product is available.

6. The method of claim 5, in which the step of selecting a complementary product is performed if the food product is not available.

7. The method of claim 1, further comprising:

deleting the food product from the order; and adding the complementary product to the order.

8. The method of claim 7, in which the step of adding the complementary product to order comprises:

adding the complementary product to the order for price of the food product.

9. The method of claim 1, further comprising:

registering the complementary product as sold.

10. The method of claim 1, further comprising:

increasing an order price by a predetermined surcharge.

11. The method of claim 10, in which the predetermined surcharge is based on the age of the complementary product.

12. The method of claim 10, in which the predetermined surcharge is based on an amount of change due.

13. The method of claim 1, further comprising:

determining whether the food product has an age within a second predetermined age range.

14. The method of claim 13, further comprising:

performing the step of selling if the food product does not have an age within a second predetermined age range.

15. A computer based method for selling an aging food product, comprising:

receiving an order for a food product, the food product having a price;

determining that the food product is unavailable;

selecting a complementary product based on the food product, the complementary product having an age within a predetermined age range;

determining that the complementary product that has been assembled;

outputting an offer to substitute the complementary product for the food product;

receiving a response to the offer;

deleting the food product from the order; and adding the complementary product to the order for the price of the food product.

16. The method of claim 15, in which the step of selecting a complementary product comprises:

identifying a complementary product that has been assembled.

17. The method of claim 15, in which the step of selecting a complementary product comprises:

accessing a first database to determine a complementary product that corresponds to the food product.

18. The method of claim 17, further comprising:

accessing a second database to determine whether the complementary product has an age within the predetermined age range.

19. The method of claim 15 further comprising:

registering the complementary product as sold.

20. The method of claim 15, further comprising:

increasing an order price by a predetermined surcharge.

21. The method of claim 20, in which the predetermined surcharge is based on the age of the complementary product.

22. The method of claim 20, in which the predetermined surcharge is based on an amount of change due.

23. The method of claim 15, further comprising:

determining whether the food product has an age within a second predetermined age range.

24. The method of claim 23, further comprising:

performing the step of adding the complementary product to the order if the food product does not have an age within a second predetermined age range.

25. An apparatus for selling an aging food product, comprising:

a processor, a storage device connected to the processor; and the storage device storing a program for controlling the processor; and the processor operative with the program to:

receive an order for a food product;

select a complementary product based on the food product, the complementary product having an age within a predetermined age range;

output an offer to substitute the complementary product for the food product;

receive a response to the offer; and sell the complementary product in place of the food product if the response indicates acceptance of the offer.

26. The apparatus of claim 25, in which the processor is further operative with the program to:

identify a complementary product that has been assembled.

27. The apparatus of claim 25, in which the processor is further operative with the program to:

access a first database to determine a complementary product that corresponds to the food product.

28. The apparatus of claim 27, in which the processor is further operative with the program to:

access a second database to determine whether the complementary product has an age within the predetermined age range.

29. The apparatus of claim 25, in which the processor is further operative with the program to:

determine if the food product is available.

30. The apparatus of claim 29, in which the processor is further operative with the program to select a complementary product if the food product is not available.

31. The apparatus of claim 25, in which the processor is further operative with the program to:

delete the food product from the order; and add the complementary product to the order.

32. The apparatus of claim 31, in which the processor is further operative with the program to:

add the complementary product to the order for price of the food product.

33. The apparatus of claim 25, in which the processor is further operative with the program to:

register the complementary product as sold.

34. The apparatus of claim 25, in which the processor is further operative with the program to:

increase an order price by a predetermined surcharge.

35. The apparatus of claim 34, in which the predetermined surcharge is based on the age of the complementary product.

36. The apparatus of claim 34, in which the predetermined surcharge is based on an amount of change due.

37. The apparatus of claim 25, in which the processor is further operative with the program to:

determine whether the food product has an age within a second predetermined age range.

38. The apparatus of claim 37, in which the processor is further operative with the program to:

perform the step of selling if the food product does not have an age within a second predetermined age range.

39. An apparatus for selling an aging food product, comprising:

a processor, a storage device connected to the processor; and the storage device storing a program for controlling the processor; and the processor operative with the program to:

receive an order for a food product, the food product having a price;

determine that the food product is unavailable;

select a complementary product based on the food product, the complementary product having an age within a predetermined age range;

determine that the complementary product that has been assembled;

output an offer to substitute the complementary product for the food pro duct;

receive a response to the offer;

delete the food product from the order; and add the complementary product to the order for the price of the food product.

40. The apparatus of claim 39, in which the processor is further operative with the program to:

identifying a complementary product that has been assembled.

41. The apparatus of claim 39, in which the processor is further operative with the program to:

accessing a first database to determine a complementary product that corresponds to the food product.

42. The apparatus of claim 41, in which the processor is further operative with the program to:

accessing a second database to determine whether the complementary product has an age within the predetermined age range.

43. The apparatus of claim 39 in which the processor is further operative with the program to:

registering the complementary product as sold.

44. The apparatus of claim 39, in which the processor is further operative with the program to:

increasing an order price by a predetermined surcharge.

45. The apparatus of claim 44, in which the predetermined surcharge is based on the age of the complementary product.

46. The apparatus of claim 44, in which the predetermined surcharge is based on an amount of change due.

47. The apparatus of claim 39, in which the processor is further operative with the program to:

determining whether the food product has an age within a second predetermined age range.

48. The apparatus of claim 47, in which the processor is further operative with the program to:

performing the step of adding the complementary product to the order if the food product does not have an age within a second predetermined age range.

\* \* \* \* \*